[11] 3,610,823

[72] Inventors Henricus Wijnandus Gerardus Haenen
Emmasingel, Eindhoven, Netherlands;
Frederick Johannes Van Roessel, Paramus,
N.J.; Tan, Sing Liong, Emmasingel,
Eindhoven, Netherlands

[21] Appl. No. 678,641
[22] Filed Oct. 27, 1967
[45] Patented Oct. 5, 1971
[73] Assignee North American Philips Company Inc.
New York, N.Y.
[32] Priority Nov. 1, 1966
[33] Netherlands
[31] 6615377

[54] TELEVISION CAMERA SYSTEM
10 Claims, 3 Drawing Figs.

[52] U.S. Cl. .......... 178/7.2, 178/DIG. 29
[51] Int. Cl. .......... H04n 5/34
[50] Field of Search .......... 178/7.2, 7.2 E, 61.8

[56] References Cited
UNITED STATES PATENTS

| | | | |
|---|---|---|---|
| 2,831,057 | 4/1958 | Orthuber | 178/7.2 E |
| 2,901,539 | 8/1959 | Morgan | 178/7.2 E |
| 3,437,749 | 4/1969 | Klem | 178/7.2 E |

*Primary Examiner*—Richard Murray
*Attorney*—Frank R. Trifari

ABSTRACT: In a television camera system (e.g. a color television camera system) having a plurality of camera tubes, one of the camera tubes has a higher beam current intensity than the other tubes. The output of the one tube above a given threshold is employed to produce a control signal. The control signal is applied to control electrode of another camera tube for stabilizing potential images on the target plate of the other camera tube.

T 5143
X 5095
X 358/74

INVENTORS
HENRICUS W.G. HAENEN
FREDERIK J. VAN ROESSEL
SING LIONG TAN
BY

AGENT

INVENTORS
HENRICUS W.G.HAENEN
FREDERIK J. VAN ROESSEL
SING LIONG TAN
BY
Frank R. Trifari
AGENT

TELEVISION CAMERA SYSTEM

The invention relates to a television camera system comprising a television camera tube provided with an electron gun, having a cathode, a control electrode and an acceleration electrode and producing an electron beam which scans line- and frame-wise by means of an anode and deflection means, a target plate having a potential image corresponding to the scene to be picked up, during which scanning the electron beam stabilizes the potential image substantially on cathode potential so that across an impedance included in the output circuit of the camera tube, an output signal representative of the scene is produced and applied to means for producing a control signal.

It is generally known that great differences in brightness in a scenery to be picked up by a television camera tube corresponding to great differences in potential on the target plate, gives rise to an incorrect output signal which is not representative of the scenery. This is due to the fact that a portion of the scene having the high brightness, corresponds to a spot of high potential on the target plate which potential has to be reduced to cathode potential during the brief impact of the scanning electron beam on said spot of the target plate. The possibility of the stabilization on cathode potential depends upon the value of the current intensity of the electron beam; if this value is too low for stabilization on cathode potential, positive charge is left on said spot after scanning. After two frame periods that is to say after one field period the electron beam again strikes the same spot. It will be supposed that after two frame periods the bright portion of the scene is displaced and that a portion of low brightness of the scene is found at said spot. The positive charge left is then neutralized wholly or partly by the electron beam so that an output signal is obtained which is no longer representative of the scene at said spot. The display of the output signal on the screen of a display tube exhibits then a bright comet tail after the moving spot of high brightness.

In order to avoid comet tails on a display screen it is known to derive a control signal from the output signal of a television camera tube and to apply the same to the control electrode or the Wehnelt cylinder of the electron gun of the television camera tube. In this manner the current intensity of the electron beam is instantaneously raised for bright spots of the scene to be taken or for corresponding spots of high positive potential of the target plate, so that stabilization of the target plate on cathode potential is again possible. The disadvantages of the described control system for avoiding comet tails are self-explanatory. When a control signal is derived from the output signal of the camera tube and subsequently applied to the Wehnelt cylinder of the electron gun for varying the current intensity, oscillations are likely to occur in this system. This could be avoided by restricting the bandwidth of the control signal if this would not involve a control system with a long delay time and hence poor results. But even then oscillations may occur in the scanning mechanism.

The current intensity of the electron beam has to be raised instantaneously, since due to the relative repulsion of the negatively charged electrons, the increase in current intensity brings about an enlargement of the diameter of the electron beam. The point of impact on the target plate is thus larger so that the resolving power of the camera tube is reduced. This means that the bandwidth of the signal produced is restricted. The display of an output signal obtained with a constant diameter of the electron beam proves that the definition of the image has strongly decreased.

Consequently, by using a fast control system, the comet tail does not occur in the display of the output signal on a display screen, but this involves an oscillatory system and its disadvantages. If, in order to avoid oscillations, the bandwidth of the control signal is restricted, the comet tail may nevertheless occur owing to the delay time.

The television camera system according to the invention has for its object to avoid comet tails in the display of scenes having portions of high brightness on a television screen by means of a fast control system, in which no oscillations can occur.

The camera system according to the invention is characterized in that it comprises at least one second camera tube whose electron gun produces an electron beam having, in a static state, a lower current intensity than that of the electron gun of the first camera tube, whilst the control signal derived from the output signal of the first camera tube above a threshold value thereof, is applied to at least one control electrode of the second camera tube which control electrode affects the stabilization of the potential image of the target plate.

The invention is based on the recognition of the fact that an open control system provides a full solution of the difficulties in a circuit arrangement for avoiding comet tails. For this purpose it is required that the potential image on the target plate should be sufficiently stabilized in the noncontrolled camera tube supplying the control signal. This is achieved by using an electron beam of adequate current intensity. The output signal which would then bring about a reduction of image definition on the display screen serves in this case alone as a source of the control signal or contributes thereto. The first camera tube together with the second camera tube controlled by the control signal and supplying the desired output signal of large bandwidth provides the desired open control system of the television camera system according to the invention.

The fields of use for the television camera system proposed are many: for example X-ray television, an audiography where rapidly varying phenomena with great brightness differences occur; also in furnaces great brightness differences occur where the frames produce rapid variations. A camera system, in which for example one camera tube supplied only the control signal and a second camera tube, controlled by said signal provides the desired output signal ensures a satisfactory definition of the displayed image. For color television purposes, for example, a plurality of camera tubes may be used, one of which supplies the control signal for all other tubes.

In a preferred embodiment of the camera system according to the invention for color television, the tube providing the blue color signal is, in addition employed for producing the control signal. This is based on the recognition that the nature of the blue color component with respect to the red and the green color components in a scene to be displayed allows a reduction of definition, since the blue color component contributes least to the final brightness signal.

The system according to the invention provides very satisfactory results especially in color television, as where comet tails may flare up in bright colors and have a very disturbing effect. As compared with the system in which each camera tube comprises its own closed control system the system according to the invention provides not only an improved operation but also a cheaper construction since duplicates of parts are avoided.

The television camera system according to the invention will now be described more fully with reference to the examples shown in the FIGURES, of which FIG. 1 shows a camera system according to the invention for color television.

Figure 1:
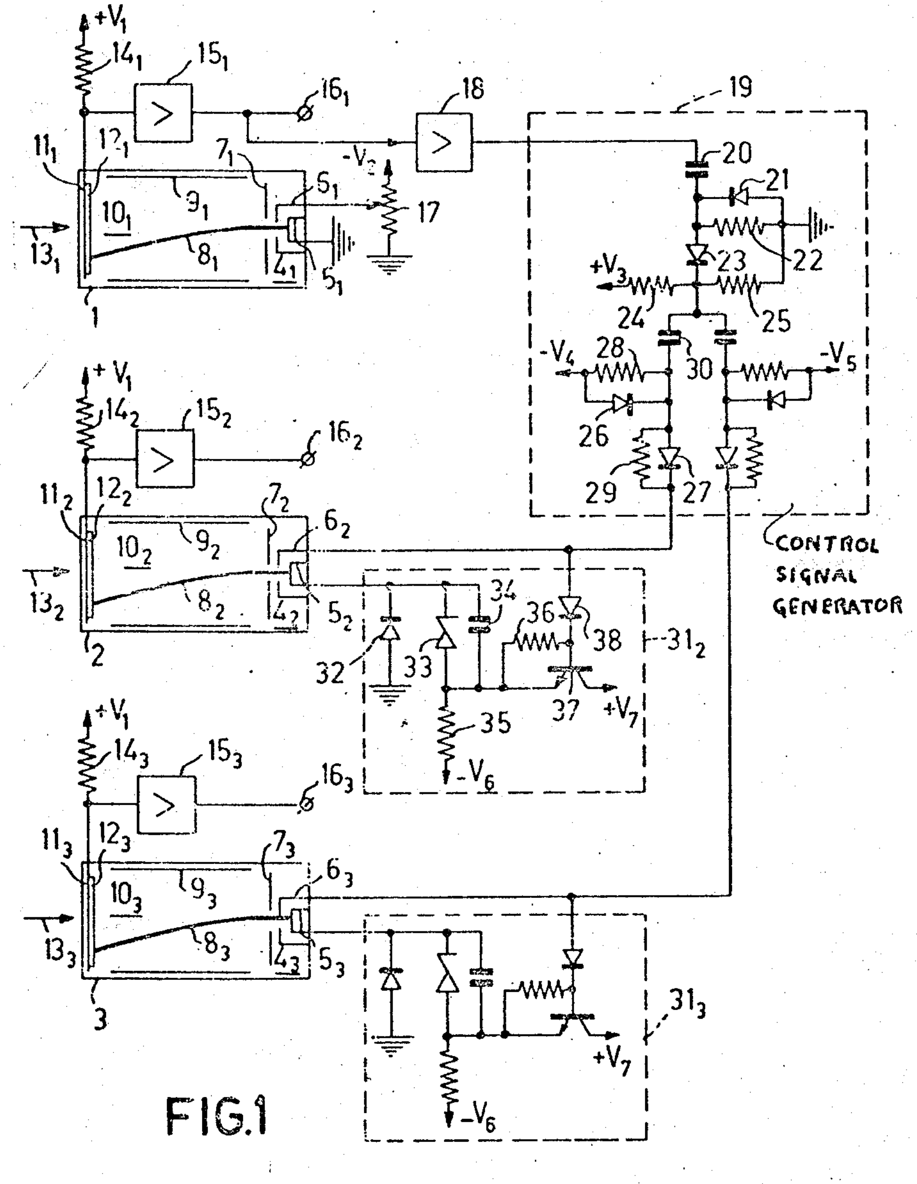

Referring to FIG. 1, reference numerals 1, 2 and 3 designate three television camera tubes of the vidicon type. They may be constructed as "Plumbicons." Since the camera tubes are of identical structure, corresponding components of the tubes are designated by the same reference numerals. If particularly a part of one of the tubes 1, 2 and 3 is referred to, this will be indicated by adding an index. This also applies to corresponding elements of the circuitry of the individual camera tubes.

Each of the camera tubes 1, 2 and 3 comprises, shown in a cross section of the tubes, an electron gun 4 having cathode 5, a control electrode 6 and an acceleration electrode 7. Under the influence of the filament, (not shown) the cathode 5 is capable of emitting electrons by thermal effect. The penetration of the electric field of the acceleration electrode 7 having positive potential through the opening of a negatively charged control electrode 6, having the form of a Wehnelt cylinder to the surface of the cathode 5 causes the electron gun 4 to produce an electron beam 8. By varying the potential of the Wehnelt cylinder 6, the current intensity is controlled, whilst also by the relative repulsion of the electrons the diameter of the electron beam 8 is controlled. For the sake of clarity, parts, not essential for a good understanding of the invention, for example, the voltage source for the acceleration electrode 7, are omitted from FIG. 1.

By means of a cylindrical anode 9, and focusing, and deflection means (not shown) the electron beam 8 scans the target plate 10 line- and frame-wise. The target plate 10 comprises a transparent, conductive signal plate 11 which is covered by a photosemiconductor layer 12 on the side facing the electron gun 4. By means of a lens system (not shown) the light (arrow 13) of a scene to be taken is projected across the signal plate 11 on the photosemiconductor layer $12_1$. In the embodiment of FIG. 1 it is assumed that the light has been split up into the three color components so that the camera tubes 1, 2 and 3 receive the blue component (arrow $13_1$), the red component (arrow $13_2$) and the green component (arrow $13_3$) respectively.

The signal plate 11 is connected through a resistor 14 to a terminal having a positive potential $+V_1$ and through an amplifier 15 to an output terminal 16. It is assumed, also for further terminals on the circuitry having a potential that the other terminal of the voltage source $V_1$ (not shown) is connected to earth. The output signal at the terminal 16 of one of the camera tubes 1, 2 and 3, is obtained as follows: in the target plate 10 the signal plate 11 and the side of the photosemiconductor layer 12 facing the electron gun 4 constitute so to say the terminals of a capacitor. The positive potential $+V_1$ is applied via the register 14 to the signal plate 11. The photosemiconductor layer 12 constitutes a leakage resistor for said capacitor, so that in accordance with the local resistivity of the layer 12, the positive electric charge passes to the side facing the electron gun 4. In this manner a capacitor is obtained which comprises a multiple of partial capacitors. The signal plate 11 forms an uninterrupted capacitor plate whereas the side of the semiconductor layer 12 facing the electron gun 4 forms as it were a mosaic of discrete capacitor plates. During the scan the electron beam 8 serves as a switch for the consecutive connection of the partial capacitances each having a voltage depending upon their local resistivity. If after one field period, that is to say after two frame periods, the electron beam 8, scanning the target plate 10 line- and frame-wise, arrives at the same spot, the potential of the semiconductor layer 12 is locally brought substantially to cathode potential which means that the spot is stabilized on cathode potential. The charge on the semiconductor layer 12 neutralized by the electron beam 8, is transferred via the resistor 14 by the terminal at the positive potential $+V_1$, at the same time to the signal plate 11 and the resultant current pulse produces an instantaneous voltage drop across the resistor 14. By projecting light (arrow 13) of the scene to be taken across the transparent signal plate 11 onto the photosemiconductor layer 12, the resistivity thereof is varied locally so that the side of the layer 12 facing the electron gun 4 exhibits the potential image which corresponds to the scene. In this manner the scene to be taken in converted line- and frame-wise into electric signals appearing in the output terminal 16.

In known camera systems the camera tubes are usually adjusted as is indicated in FIG. 1 for the camera tube 1, The cathode $5_1$ is connected to earth whereas the control electrode $6_1$ is connected to an adjustable tapping of a resistor 17. By means of the adjustable tapping of the resistor 17, arranged between the terminal at a negative potential $-V_2$ and earth, the current intensity of the electron beam $8_1$ can be controlled. If the focusing of the electron beam $8_1$ is not varied, the diameter of the beam on the target plate 10 is determined. As stated above, the diameter of the beam will increase owing to the relative repulsion of electrons with an increasing current intensity and unchanged focusing. Focusing is, of course adjusted so that this increase will not be excessive. In this manner an acceptable definition of the blue color signal is guaranteed even if the current intensity of the electron beam $8_1$ is increased in order to obtain stabilization on cathode potential even in the brightest scenes.

According to one aspect of the invention namely, the tapping of the resistor 17 is adjusted for the camera tube 1, supplying the blue color signal, so that the electron gun $4_1$ produces an electron beam $8_1$ having a current intensity sufficient for stabilizing spots of high positive potential on the target plate $10_1$ corresponding to bright parts of the scene. As stated above, the resolving power of the tube 1 is reduced owing to the larger diameter of the electron beam $8_1$. However, since the picture displayed by a color television receiver contains only a low percentage of the blue color signal the reduced resolving power of tube 1 will not have a disturbing effect on the picture.

The output signal at the terminal $16_1$ is applied via an amplifier 18 to means 19 for producing a control signal. After a separation capacitor 10, the direct voltage component is restored in the output signal by means of an earth-connected parallel combination of a diode 21 and a resistor 22. Thus the black level in the output signal is brought to earth potential. Then the signal is applied to a threshold device, comprising a diode 23, the cathode of which is connected to a potentiometer having resistors 24 and 25 between a terminal at a potential $+V_3$ and earth. The values of the resistors 24 and 25 determine the threshold value with respect to the black level at earth potential, the output signal producing a control signal in excess of said threshold value, said control signal being applied to the Wehnelt cylinders $6_2$ and $6_3$.

The circuitries of the tubes 2 and 3 are similar with the exception of the different potentials at Wehnelt cylinders $6_2$ and $6_3$ required for obtaining a given current intensity of the electron beams $8_2$ and $8_3$ owing to the tolerances of the tubes 2 and 3. As is indicated in FIG. 1, if no control signal is produced in the means 19, the potential for the Wehnelt cylinders $6_2$ and $6_3$ is derived from a terminal at a potential $-V_4$ and $-V_5$ respectively.

The production of the control signal for the camera tube 2 will now be described in detail. If the output signal of the camera tube 1, amplified by the amplifier 18, does not exceed the threshold value determined by resistors 24 and 25, no control signal is produced. Then the Wehnelt cylinder $6_2$, which has a parasitic capacitance with respect to the cathode $5_2$ and earth, is at a potential $-V_4$, since it is connected via the series combination of the parallel connected diode 26 and resistor 28 and 27, 29 respectively to the terminal of the negative potential $-V_4$. If a short, positive-going signal does exceed the threshold value determined by the resistors 24 and 25, the resultant control signal is directly applied through the separation capacitor 30 and the diode 27 to the Wehnelt cylinder $6_2$. The potential of the Wehnelt cylinder $6_2$ thus becomes less negative with respect to the potential $-V_4$. The positive charge of the Wehnelt cylinder $6_2$ by the control voltage is transferred to the terminal of the potential $-V_4$ via resistors 29 and 28 since the diodes 27 and 26 are cut off. Thus a kind of valve effect is obtained, the Wehnelt cylinder $6_2$ receiving abruptly a positive charge which is drained slowly, for example, within some hundredths of a line period with regard to Wehnelt cylinders $6_3$ having a potential $-V_5$, the same mechanism occurs.

The result of these measures will be easily understood. In a scene having parts of a brightness lying between the minimum value for example black and a normal maximum value, for example top white, the electron beams $8_2$ and $8_3$ for top white, have a current intensity which is approximately sufficient for stabilizing the potential images on the target plates $10_2$ and $10_3$ corresponding to the scene on cathode potential. For this purpose, the Wehnelt cylinders $6_2$ and $6_3$ receive a potential $-V_4$ and $-V_5$ respectively, whilst the cathodes $5_2$, $5_3$ are supposed to be connected to earth. The electron gun $4_1$ provides an electron beam $8_1$ of higher current intensity so that the potential image of the target plate $10_1$ is sufficiently stabilized on cathode potential even for higher values than top white. However, if the scene comprises portions of high brightness exceeding top white, the potential image on the target plate $10_1$ is established on cathode potential but if no precautions are taken, the potential images on the target plates $10_2$ and $10_3$ will not be stabilized on the cathode potential. If for example, top white in the output signal of the camera tube 1 corresponds to the threshold value determined by the means 19 the latter will ensure that the potential images on the target plates $10_2$ and $10_3$ are jet stabilized completely on cathode potential. When a spot of high potential in the potential image on the target plate $10_1$ is reached, the current intensities of the electron beams $8_2$ and $8_3$ are instantaneously raised. The delay and the bandwidth restriction of the circuitry of FIG. 1 can be simply obviated by causing the electron beam $8_1$ to scan the target plate $10_1$, for example, some hundredths of a line period earlier than in the camera tubes 2 and 3. By delaying the output signal at the terminal $16_1$ by means of a delay line for the same small part of a line period, errors of coincidence are avoided in the common display of the three color signals blue, red and green after various processes. If the bandwidth restriction for the blue color signal is employed for reducing crosstalk, the resultant delay will be eliminated in the same manner in this control system.

The measures described for the camera system according to the invention provide surprisingly satisfactory results for scenes having portions of high brightness. If, however, a scene has portions of very high brightness differences, said measures are not adequate. The maximum permissible current intensity of the electron beam 8 in the camera tubes 1, 2 and 3 determines the maximum charge or potential on the target plate which can still be neutralized or stabilized respectively on cathode potential or earth potential.

According to a further aspect of the invention bright comet tails are very bright moving portions of a scene are avoided by applying the control signal produced by the means 19, after having exceeded the second threshold value, both to the Wehnelt cylinders $6_2$ and $6_3$ and to the cathodes $5_2$ and $5_3$ of the electron guns $4_2$ and $4_3$ respectively. It is thus ensured that when a maximum permissible current intensity of the electron beams $8_2$ and $8_3$ is not sufficient to neutralize the locally very high positive charge on the target plates $10_2$ and $10_3$, the cathode potential is instantaneously rendered more positive. By the increase of the cathode potential, the remanent local charge of the target plate $10_2$ and $10_3$ corresponding to moving, very bright portions of a scene can be conducted away without the appearance of troublesome comet tails.

In FIG. 1 it is illustrated that this is achieved by applying the control signal produced by the means 19 to means $31_2$ and $31_3$ of similar structure.

The cathode $5_2$ of the electron gun $4_2$ is connected to the means $31_2$ and is connected on the one hand to the cathodes of a diode 32 whose anode is connected to earth and on the other hand via the parallel combination of a Zener diode 33 and a decoupling capacitor 34 in series with a resistor 35 to a terminal of negative potential $-V_6$. The junction of the Zener diode 33 and the resistor 35 is directly connected to the emitter and through a resistor 36 to the base of an NPN transistor 37. The collector of the transistor 37 is connected to a terminal of positive potential $+V_7$. The base of the transistor 37 also receives the control signal produced by the means 19 and applied to the Wehnelt cylinder $6_2$ via a diode 38, which is connected in the pass direction for the signal.

The means $31_2$ operate as follows:

If the Wehnelt cylinder $6_2$ is at a potential $-V_4$ the diode 38 is cut off. Thus a current will flow from earth through the diode 32, the Zener diode 33 and the resistor 35 to the terminal of the potential $-V_6$. The cathode $5_2$ is then at earth potential apart from the voltage drop across the diode 32. The voltage drop across the Zener diode 33 is transferred directly to the emitter via the resistor 36 to the base of the transistor 37 so that the latter is cut off. Owing to the control signal of the means 19, the potential at the Wehnelt cylinder $6_2$ becomes less negative than the potential of the base of the transistor 37 the diode 38 becomes conducting. The voltage drop across the resistor 36 will also cause the transistor 37 to be conducting. The increased current and hence the increased voltage drop across the resistor 35 will raise the potential of the cathode $5_2$ above earth potential with the aid of the decoupling capacitor 34 so that the diode 32 is cut off. According as the control signal of the means 19, exceeds a threshold value determined by the means $31_2$ to a greater or lesser extend, the cathode potential of the electron gun $4_2$, will also rise above earth potential to a greater or lesser extend. An identical control is obtained for the camera tube 3, with the aid of the means $31_3$ identical with the means $31_2$.

With a particularly high brightness value, in the scene the potential at which the target plate is stabilized becomes positive with respect to earth. During the time in which the voltage at the Wehnelt cylinder $6_2$ approaches the threshold value associated with the means $31_2$ owing to the draining of the charge of the parasitic capacitor between the Wehnelt cylinder and the cathode ($6_2$, $5_2$) the potential of the cathode $5_2$ again approaches earth potential.

Figure 2:
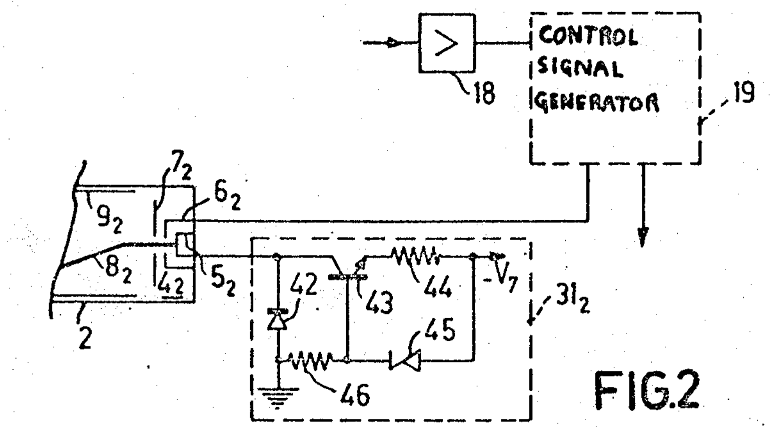
FIG. 2 shows a variant of parts of said camera system.

FIG. 2 shows for the camera tube 2 a variant of the means $31_2$. Corresponding elements of FIGS. 1 and 2 are designated by the same reference numerals.

The control signal produced by the means 19 is applied to the Wehnelt cylinder $6_2$. A cathode $5_2$ of the electron gun $4_2$ is connected to the means $31_2$ and is connected on the one hand to the cathodes of the diode 42 whose anode is connected to earth, and on the other hand to the collector of an NPN transistor 43. The emitter and the base of the transistor 43 is connected through resistor 44 and a Zener diode 45, respectively to a terminal having a negative potential $-V_7$. The base of the transistor 43 is connected via a resistor 46 to earth.

The means $31_2$ operate as follows:

If the Wehnelt cylinder $6_2$ is at a substantially constant potential $-V_4$, the diode 42 and the transistor 43 are conducting. Since the base of the transistor 43 is connected by a Zener diode 45 providing a constant bias voltage, to the emitter, the transistor 43 and the resistor 44 are traversed by a substantially constant current. The value of this constant current has to be equal to the sum value of the current passing through the diode 42 and the current produced by the electron gun $4_2$. If the Wehnelt cylinder $6_2$ is at a negative potential $-V_4$, so that the electron gun $4_2$ produces a maximum current, the maximum current flows through the diode 42. However, if the means 19 produce a control signal raising the potential at the wehnelt cylinder $6_2$ to a less negative value, the current produced by the cathode $5_2$ will increase so that the current passing through the diode 42 will decrease to the same extend. If the potential at the Wehnelt cylinder $6_2$ becomes so little negative that the current through the diode 42 becomes zero, said threshold value is reached. With a still less negative potential value at the Wehnelt cylinder $6_2$ the current produced by the electron gun $4_2$ will no longer increase and since the diode 42 is no longer conducting, the potential at the cathode $5_2$ does increase.

With the aid of the means $31_2$ described above, the two variants of which may be employed in conjunction in the camera system according to the invention a very simple control is obtained when the maximum current intensity of the electron beams of the camera tubes 2 and 3 is reached.

Figure 3:
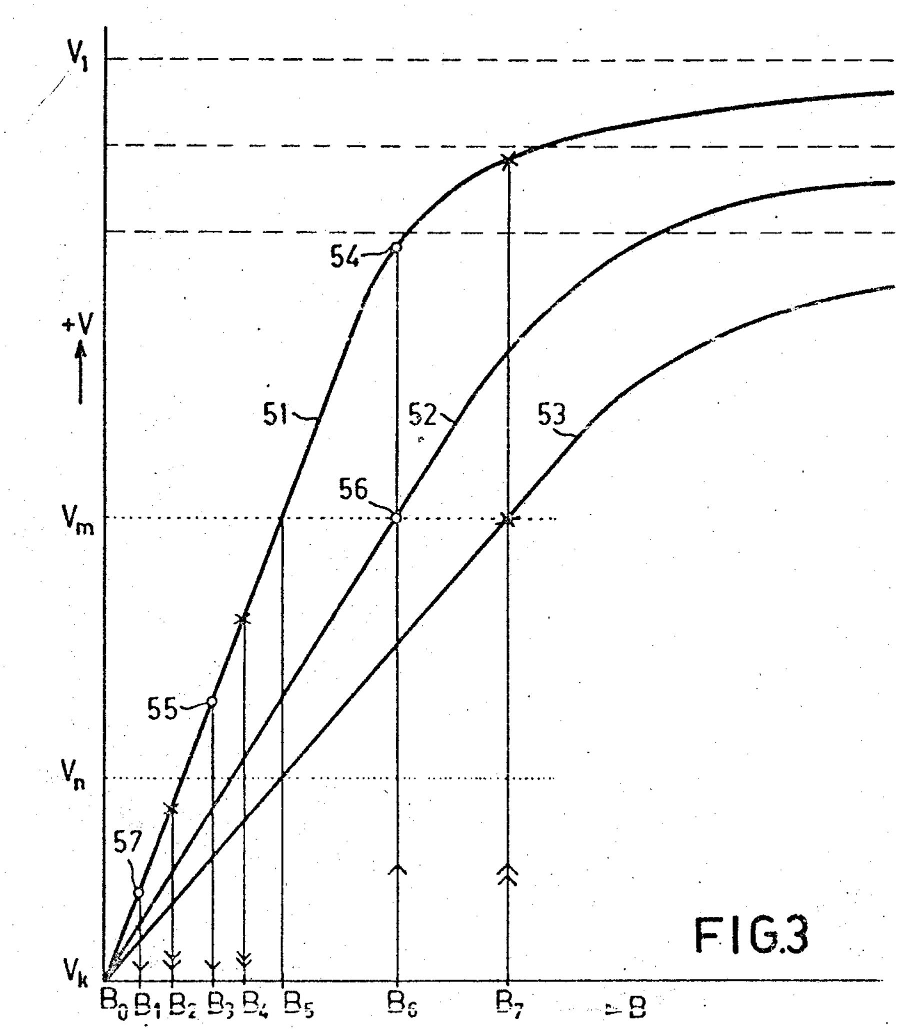
FIG. 3 illustrates the effect obtained by carrying out the invention.

The effect obtained by means 19 and 31 will be described with reference to FIG. 3. The FIGURE shows for this purpose, potential-brightness characteristic curves of a vidicon camera tube. The local potential V of the side of the semiconductor layer 12 facing the electron gun 4 is plotted as a function of the local brightness B of the scene and projected onto the target plate 10 of the camera tube 2 or 3. The effect is explained with the aid of a characteristic curve associated with a given point on the target plate 10 scanned by the electron beam 8 to consecutive frame periods. The voltage drop across the electron beam 8 between the electron gun 4 and the point of impact on the target plate 10, is neglected so that with an adequate current intensity of the electron beam 8, the point of impact is stabilized on cathode potential ($V_k$ FIG. 3). The characteristic curve 51 is associated with a potential of the signal plate equal to $V_1$; the characteristic curve 52 and the curve 53 with respective lower values.

If with a potential of the signal plate $V_1$, the local brightness $B_5$ appears in the scene projected onto the target plate 10, a potential value $V_m$, corresponds thereto at the said place in the characteristic curve 51. The potential $V_m$ is the very potential that will still be stabilized on the cathode potential $V_k$ by the electron beam 8 with a maximum value of the current intensity, which means that the brightness $B_5$ and the potential $V_m$ correspond to the threshold value at which the means 31 become operative. The (first) threshold value above which the means 19 produce a control signal for increasing the current intensity at the camera tubes 2 and 3 is indicated by the corresponding potential $V_x$. The potential ($V_x-V_k$) is therefore the potential at which the electron beam 8 of noncontrolled, constant current intensity is still capable of stabilizing on cathode potential $V_k$ the point of impact on the target plate 10.

If the scene has a portion of the brightness $B_6$ and if the means 31 are not operative, the potential at the corresponding spot on the target plate 10 will assume a value indicated by 54. This value can be reduced by the electron beam 8 with the maximum current intensity only by a potential ($V_m-V_k$) so that after the passage of the electron beam across said spot, the potential associated with point 55 are left. If after the passage the local brightness immediately becomes for example $B_0$, (black level) the camera tubes 2 and 3 will nevertheless produce an output signal after two frame periods which signal is representative of the brightness $B_3$. After the moving spot of very high brightness $B_6$ a comet tail of brightness $B_3$ thus appears.

If the means 31 operate at the appearance of a scene portion of the brightness $B_6$, the potentials of the cathodes $5_2$ and $5_3$ will be raised. If an instantaneous relative rise of the potential of cathode 5 with respect to the signal plate 11 is equivalent to a local instantaneous decrease of the potential of signal plate 11 with respect to the cathode 5 the effect of the measure according to the invention in this system will be easily understood. As is shown in FIG. 3, an increase in cathode potential $V_k$ is converted in a corresponding decrease of the signal plate potential $V_1$, with which are associated the characteristic curves 52 and 53 in accordance with the value of this decrease. The increase of the potential of the cathode 5 is such that for the moment the characteristic curve 52 applies to the point of impact on the target plate 10, this point of impact will be at a potential associated with point 56 under the influence of the local brightness $B_6$ with respect to the cathode 5. The electron beam 8 will reduce this potential (point 56) by a value ($V_m-V_k$) so that the point of impact is completely stabilized on a cathode potential $V_k$, which is then increased. Consequently, positive charge is left at the point of impact in accordance with the increase of potential of the cathode 5. If after two frame periods the local brightness is $B_0$ (black level) the electron beam 8 has nevertheless to neutralize the remanent charge. Then the characteristic curve 51 applies again, so that an output signal is obtained which corresponds to the potential of point 57 or the brightness $B_1$. Consequently the measure according to the invention reduces the brightness of the comet tail from $B_3$ to $B_1$.

A moving scene portion of the very high brightness $B_7$ will produce in the same manner with the aid of an increase in cathode potential (for example resulting in the characteristic curve 53) a comet tail having, instead of a high brightness $B_4$ a comparatively low brightness $B_2$. A control by which the brightness $B_7$ is combined with an increase in cathode potential corresponding to the characteristic curve 52 is also possible, although during the first scan no complete stabilization cathode potential is then obtained.

The same effect as described above is obtained in the plumbicon-type camera tube, having a brightness-potential characteristic curve, the linear slopes of which vary to a lesser extend, than the vidicon type tube for low brightness values.

Obviously the control according to the invention may also be carried out in camera systems comprising different types of television camera tubes. The camera system comprising four camera tubes for example one orthicon and three vidicon tubes or plumbicon tubes does not give rise to additional difficulties.

We claim:

1. A television camera system comprising first and second camera tubes each having a target plate adapted to receive light from the same scene, an electron gun for producing an electron beam for scanning the respective target plate, and output terminal means connected to the respective target plate, said electron guns each having at least one control electrode whereby the current intensity of the electron beam is dependent upon the potential applied to the control electrode of the respective electron gun, means for biasing the control electrodes of the electron guns of said first and second camera tubes whereby the electron beam of said first tube has a higher current intensity than the electron beam of said second tube, threshold circuit means connected to the output terminal of said first tube for producing a control signal when the output signal from said first tube exceeds a given amplitude, and means for applying said control signal to the control electrode of the electron gun of said second tube, whereby the electron beam current intensity of said second tube is increased.

2. A system as claimed in claim 1 wherein said second tube comprises a vidicon tube and said second tube control electrode comprises a Wehnelt cylinder.

3. A system as claimed in claim 2 further comprising second threshold circuit means coupled between said first recited threshold means and said Wehnelt cylinder and said second tube electron gun.

4. A system as claimed in claim 3 wherein said second threshold circuit comprises a transistor having emitter, base, and collector electrodes, a diode coupled between said applying means and said base, a resistor coupled between said base and emitter, a resistor coupled between said emitter and a voltage source, and a diode coupled between the second tube gun cathode and ground.

5. A system as claimed in claim 2 further comprising a third vidicon camera tube coupled to receive said control signal.

6. A system as claimed in claim 5 wherein said first camera tube supplies a signal indicative of the blue color component of said light from said scene.

7. A system as claimed in claim 1 wherein said applying means comprises a first separation capacitor coupled to said output terminal, a direct current restorer coupled between said first separation capacitor and said threshold circuit, a second separation capacitor coupled to said threshold circuit, a first parallel circuit including a diode and a resistor coupled between said second separation capacitor and said second tube control electrode, and a second parallel circuit including a diode and a resistor coupled between said second separation capacitor and a voltage source.

8. A system as claimed in claim 1 further comprising a second threshold circuit comprising a constant current source including a transistor coupled to the second tube cathode, and a diode coupled to the second tube cathode.

9. In a television pickup system employing an image pickup tube for converting an applied optical image into a video signal in which the image pickup tube is operated with a relatively low scanning beam current, apparatus for automatically increasing the scanning beam current at high light levels where the beam current would otherwise be insufficient to neutralize the corresponding charge on the target electrode of the image pickup tube, said apparatus comprising: an auxiliary television pickup tube receiving the same optical image and having its scanning synchronized with that of said image pickup tube; and means receiving the video signal output of said auxiliary tube and coupled to said image pickup tube for increasing the scanning beam current in the image pickup tube whenever the amplitude of said video signal exceeds a preset level.

10. Apparatus as claimed in claim 9, in which the scanning of said auxiliary tube is adjusted to reach any given point in its scanned area earlier than the scanning of said image pickup tube reaches the corresponding point in its scanned area by the amount of the system delay in the beam current increasing means.